United States Patent
Miyazaki

(10) Patent No.: US 8,692,888 B2
(45) Date of Patent: Apr. 8, 2014

(54) IMAGE PICKUP APPARATUS

(75) Inventor: Yasuyoshi Miyazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 487 days.

(21) Appl. No.: 12/410,258

(22) Filed: Mar. 24, 2009

(65) Prior Publication Data

US 2009/0295926 A1 Dec. 3, 2009

(30) Foreign Application Priority Data

Jun. 2, 2008 (JP) ................................. 2008-144549

(51) Int. Cl.
*H04N 5/225* (2006.01)

(52) U.S. Cl.
USPC ........................................................ 348/169

(58) Field of Classification Search
USPC .......................................... 348/169; 382/103
See application file for complete search history.

(56) References Cited

U.S. PATENT DOCUMENTS

| | | | |
|---|---|---|---|
| 6,380,986 B1 * | 4/2002 | Minami et al. ................. | 348/699 |
| 6,507,366 B1 * | 1/2003 | Lee ................................ | 348/352 |
| 6,594,314 B1 * | 7/2003 | Ando ........................ | 375/240.16 |
| 6,765,965 B1 * | 7/2004 | Hanami et al. ........... | 375/240.16 |
| 7,057,646 B2 * | 6/2006 | Yasuda ..................... | 348/208.99 |
| 7,451,633 B2 * | 11/2008 | Bang et al. ..................... | 73/1.38 |
| 2002/0054211 A1 * | 5/2002 | Edelson et al. ............... | 348/169 |
| 2002/0118862 A1 * | 8/2002 | Sugimoto et al. ............ | 382/103 |
| 2004/0141065 A1 * | 7/2004 | Hara et al. ............... | 348/208.11 |
| 2004/0257444 A1 * | 12/2004 | Maruya et al. ................ | 348/169 |
| 2005/0147277 A1 * | 7/2005 | Higaki et al. ................. | 382/103 |
| 2006/0044404 A1 * | 3/2006 | Hatanaka .................. | 348/208.4 |
| 2006/0140612 A1 | 6/2006 | Yata | |
| 2007/0014432 A1 * | 1/2007 | Tsunashima .................. | 382/103 |
| 2007/0263995 A1 * | 11/2007 | Park et al. ....................... | 396/50 |
| 2008/0259175 A1 * | 10/2008 | Muramatsu et al. ........ | 348/222.1 |
| 2009/0147090 A1 * | 6/2009 | Miki .......................... | 348/208.1 |

FOREIGN PATENT DOCUMENTS

| | | |
|---|---|---|
| JP | 7-143389 A | 6/1995 |
| JP | 2006-184742 A | 7/2006 |

* cited by examiner

*Primary Examiner* — Abdullahi Salad

(74) *Attorney, Agent, or Firm* — Carter, DeLuca, Farrell & Schmidt LLP

(57) ABSTRACT

An image pickup apparatus includes a first detection unit configured to detect movement information of an object which is a tracking target from a movie generated at an image pickup element; a second detection unit configured to detect movement information of an apparatus main body; and a determination unit configured to determine that tracking cannot be continued when the difference between a motion vector of the apparatus main body and a motion vector of the object is larger than a certain threshold.

17 Claims, 4 Drawing Sheets

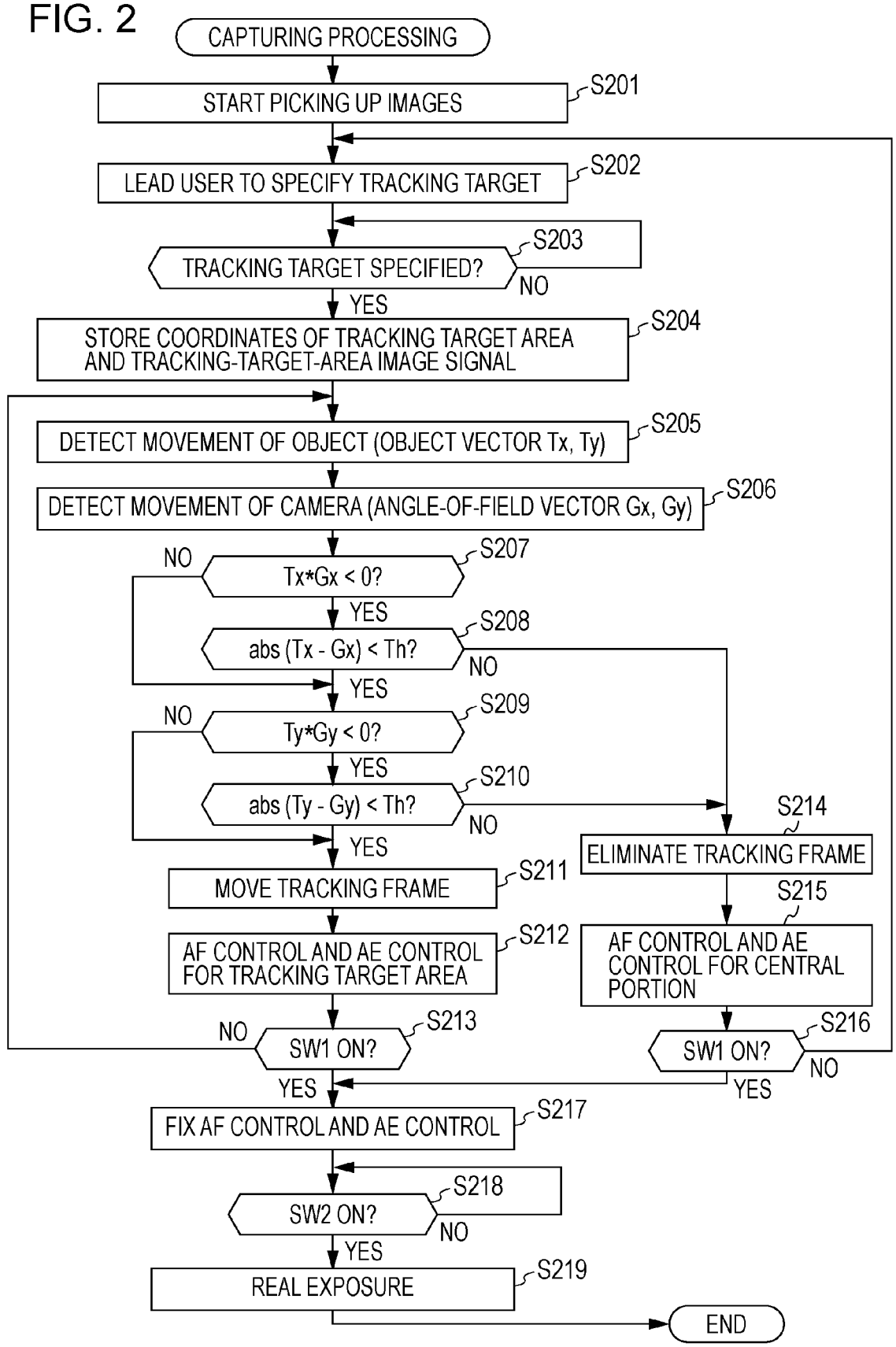

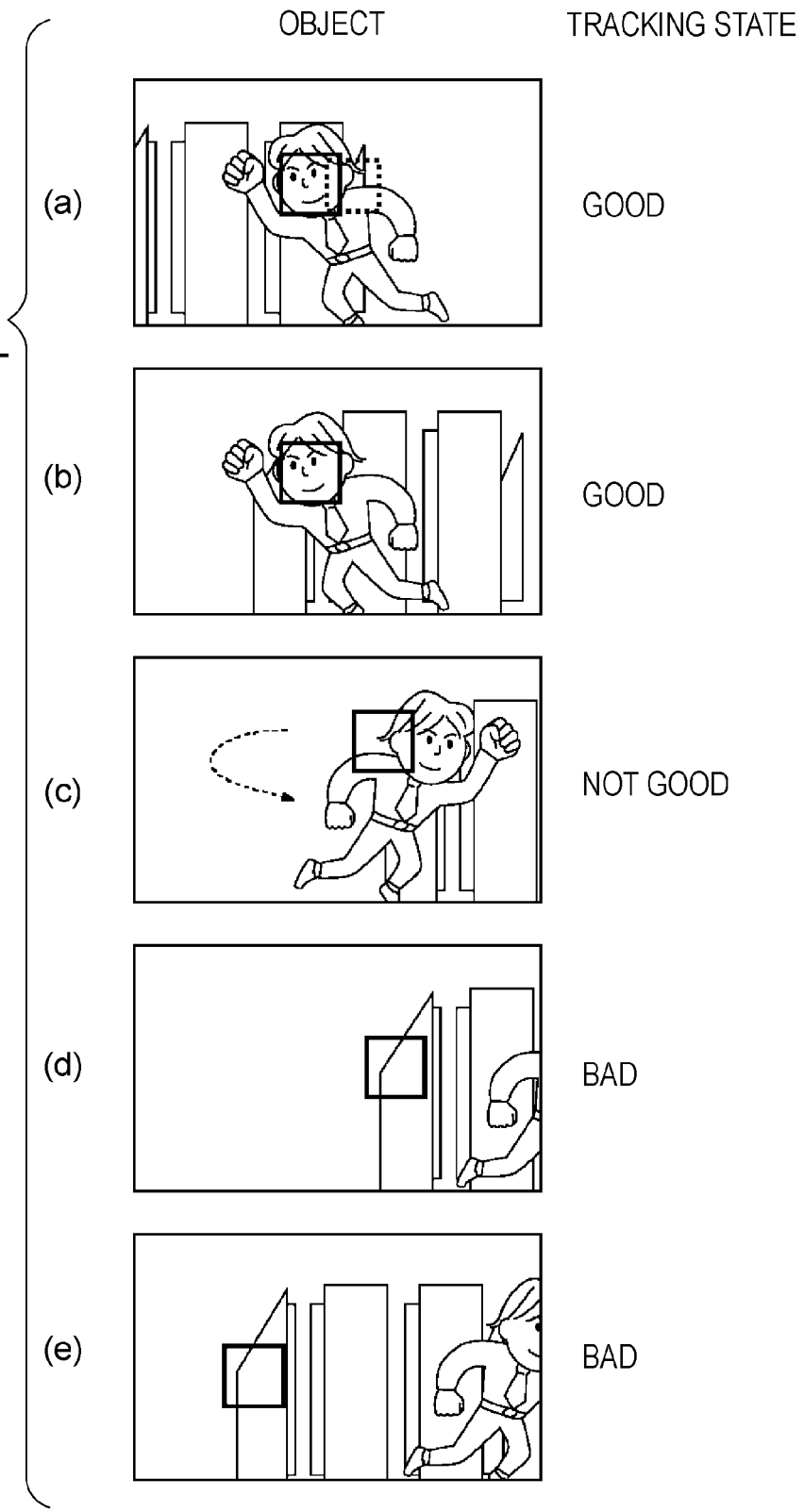

IMAGE PICKUP APPARATUS

BACKGROUND OF THE INVENTION

1. Field of the Invention

The present invention relates to an image pickup apparatus such as a digital camera, and more particularly to an image pickup apparatus that incorporates a characteristic object tracking processing technology.

2. Description of the Related Art

Digital cameras have been developed that can specify the area of an object to be captured on the basis of picked-up image data, adjust the brightness of the area of this object to be appropriate, and adjust focus.

Among these cameras, there is a camera that can track the movement of a specific object by performing pattern matching between time-series images. For example, Japanese Unexamined Patent Application Publication No. 2006-184742 discloses a structure for tracking a main object. With the structure, the main object is specified using distance information and a face-detection result, and processing for subsequently extracting, from images obtained thereafter, areas whose characteristics are similar to the characteristics of the area in which the main object has been present is performed.

However, in the case of the object tracking processing technology which has been proposed, when a camera is suddenly moved by a large amount or the main object suddenly changes its moving direction by a large amount, the camera may fail to track the movement of the main object. Moreover, although the camera has failed to track the movement, if pattern matching is continued using the area that was recognized at the moment that the main object existed, there is a problem in that tracking of an area that does not include the main object is continued.

For example, there is a known method in which a user is allowed to specify an object to be tracked, by moving a tracking frame displayed on a liquid crystal display on the back of a digital camera and the movement of the specified object is then tracked. When the movement of an object is tracked with this method, the following problem may occur.

For example, part (a) of FIG. 4 is a diagram illustrating that a tracking frame displayed in advance on a liquid crystal display has been moved to the position of the face of a person and the face of the person has been selected as a tracking target through an operation of a digital camera performed by a user. By performing matching on the basis of a partial image within the tracking frame, an area in which the processing target exists is extracted from a newly obtained image. The tracking frame is moved to and superimposed on the extracted tracking target, and is displayed. Every time a tracking target is successfully extracted, a partial image serving as a matching standard is updated, and thus even when a pattern of an object gradually changes such as the facial expression of a tracking target changes, the angle of the tracking target changes, or the like, the movement of the same object can be continuously tracked.

Part (b) of FIG. 4 is a diagram illustrating that the movement of the object is being tracked by performing such processing. However, when a person who is a tracking target suddenly changes his/her direction and an image pattern of the tracking target suddenly and greatly changes, a difference between the previous image pattern of the tracking target and the image pattern of the object actually specified as the tracking target becomes large, the previous image pattern being the pattern of the partial image extracted previously. Thus, even if the area having the highest correlation is extracted by performing matching, the position of the object specified as the tracking target cannot be precisely captured. As a result, as shown in part (c) of FIG. 4, the tracking frame may become separated from the tracking target. As a result, the tracking frame may partially include the background and a partial image to be the base of matching may also include an image pattern of the background.

Moreover, part (d) of FIG. 4 is a diagram illustrating that the image pattern of the background included in the partial image serving as the base of matching affects an extraction result regarding the tracking target, whereby the tracking frame becomes completely separated from the object and the tracking frame is fixed to the background. Thereafter, as shown in part (e) of FIG. 4, pattern matching is performed on the basis of the area of the background, and thus the tracking frame is continued to be displayed on the background.

SUMMARY OF THE INVENTION

The present invention provides an image pickup apparatus that can suppress faulty object tracking.

The present invention provides an image pickup apparatus that includes a first detection unit configured to detect movement information of an object which is a tracking target from a movie generated at an image pickup element; a second detection unit configured to detect movement information of an apparatus main body; and a determination unit configured to determine that tracking cannot be continued when the difference between a motion vector of the apparatus main body and a motion vector of the object is larger than a certain threshold.

Further features of the present invention will become apparent from the following description of exemplary embodiments (with reference to the attached drawings).

BRIEF DESCRIPTION OF THE DRAWINGS

FIG. 2 is a flowchart illustrating the procedure of capturing processing executed by the digital camera shown in FIG. 1.

FIG. 4 includes diagrams illustrating the position of an object and the tracking state.

DESCRIPTION OF THE EMBODIMENTS

Various exemplary embodiments, features, and aspects of the invention will be described in detail below with reference to the drawings.

Figure 1:
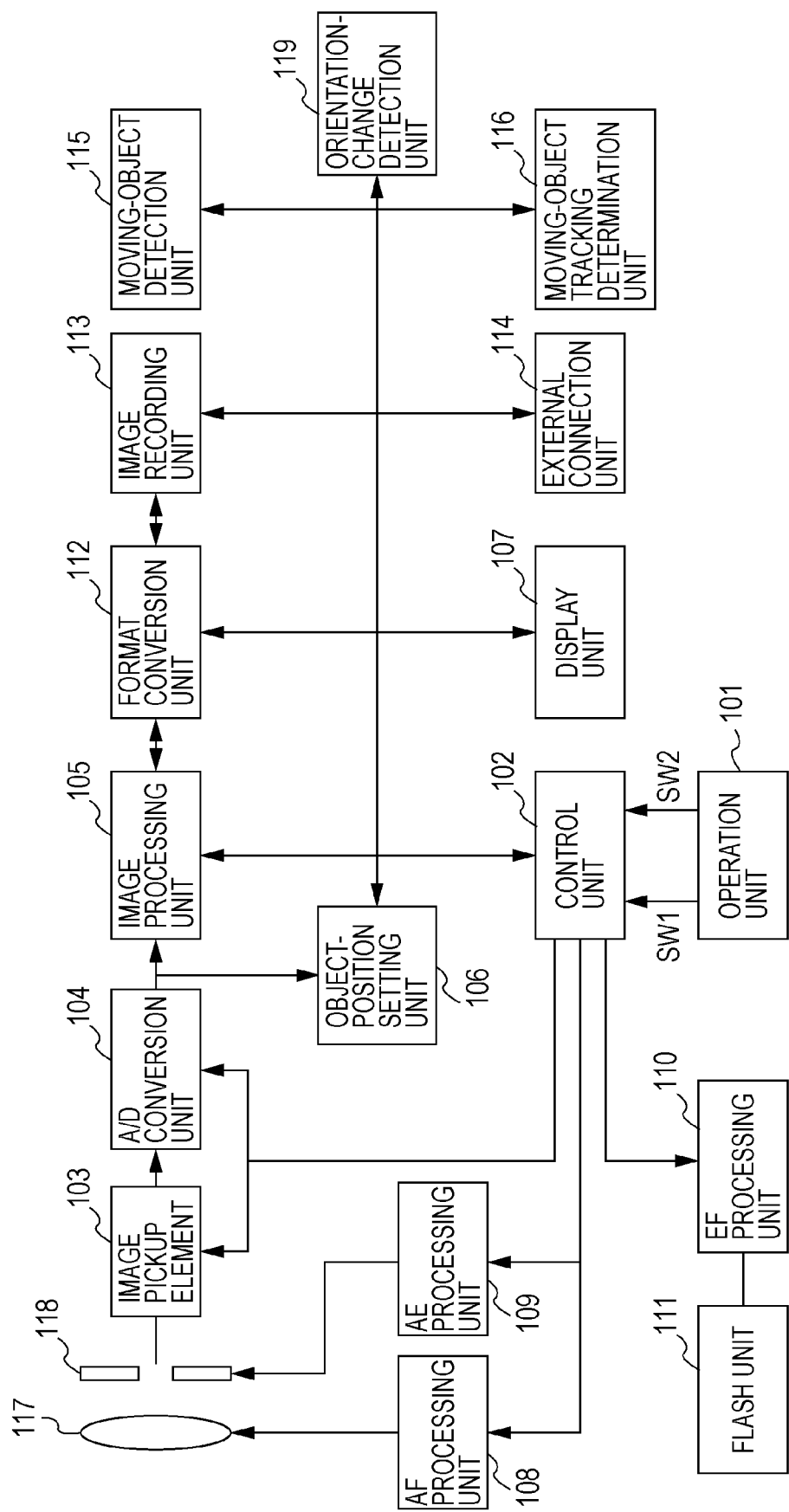
FIG. 1 is a block diagram of a digital camera serving as an image pickup apparatus according to an embodiment of the present invention.

FIG. 1 is a block diagram of a digital camera serving as an image pickup apparatus according to an embodiment of the present invention.

In FIG. 1, an operation unit 101 includes switches and buttons with which a user of the digital camera can input various instructions to the digital camera. The operation unit 101 also includes a shutter switch. When this shutter switch is half pressed, an SW 1 signal is sent from the operation unit 101 to a control unit 102. When the shutter switch is fully pressed, an SW 2 signal is sent from the operation unit 101 to the control unit 102.

The control unit 102 is a unit that controls operations of various units shown in FIG. 1, and controls various units in response to an instruction from the operation unit 101. The control unit 102 controls the operation of the entire digital camera in a centralized manner.

An image pickup element 103 receives light incident through a lens 117 and an exposure mechanism 118 and outputs electric charge that corresponds to the light quantity. The image pickup element 103 includes a photoelectric conversion element such as a charge-coupled device (CCD) sensor or a complementary metal oxide semiconductor (CMOS) sensor.

The lens 117 is a lens unit that includes a plurality of lenses. The lens 117 includes a focus lens for focusing an object image on the image pickup element 103 and an optical zoom lens for changing the magnification of the object image which is formed onto the image pickup element 103. The exposure mechanism 118 includes an aperture for adjusting the light quantity of the object image that reaches the image pickup element 103 and a shutter for shielding the image pickup element 103 from light so as to prevent the object image from reaching the image pickup element 103.

An autofocus (AF) processing unit 108 drives the focus lens included in the lens 117 in order to adjust focus state regarding the object image formed onto the image pickup element 103. An auto exposure (AE) processing unit 109 adjusts the size of an opening of the aperture of the exposure mechanism 118 and shields the image pickup element 103 from light using the shutter in order to control the light quantity of the object image that reaches the image pickup element 103.

An analog-to-digital (A/D) conversion unit 104 performs sampling, gain control, A/D conversion, and the like on an analog image signal output from the image pickup element 103 and outputs a digital image signal.

An image processing unit 105 performs various image processing including white balance processing, gamma conversion processing, and color conversion processing on the digital image signal output from the A/D conversion unit 104 and outputs a digital image signal converted into a YUV image signal.

An object-position setting unit 106 sets an area which is arbitrarily set through a button operated by a user, the button being included in the operation unit 101 but not shown in the figure, as a tracking target area in which an object, which is the tracking target, exists. Alternatively, the object-position setting unit 106 may include a function of detecting an area in which the face of a person exists using an edge shape in an image, and may be configured to automatically set this detected face area of the person as a tracking target area. The object-position setting unit 106 functions as a setting unit that sets an area to be a tracking target.

A moving-object detection unit 115 detects, as object movement information, the movement of an object in a tracking target area set by the object-position setting unit 106 in any one of frame images by comparing digital image signals continuously obtained in time sequence and performs tracking processing.

An orientation-change detection unit 119 detects, as camera movement information, the movement of a digital camera using an angular velocity sensor that includes a gyroscope.

A moving-object tracking determination unit 116 compares the object movement information with the camera movement information, and determines whether tracking should be continued.

When receiving an instruction for turning on a flash from the control unit 102, an EF processing unit 110 causes a flash unit 111 to emit light of a certain intensity that corresponds to the instruction from the control unit 102. The control unit 102 determines that a flash is necessary when the brightness of an object, which is a tracking target, is low and sends an instruction for turning on a flash to the EF processing unit 110.

A display unit 107 includes a small liquid crystal display and the like, and displays an image using a digital image signal processed by the image processing unit 105. Display of images generated by the image pickup element 103 as a movie in real time allows a user of the camera to observe what is going on with the object.

A format conversion unit 112 converts the format of the digital image signal (image data) output from the image processing unit 105 into a format such as JPEG, and outputs the resulting data to an image recording unit 113.

The image recording unit 113 records image data on which format conversion has been performed and which is received from the format conversion unit 112 in a memory, which is provided within this digital camera but not shown in the figure, an external memory inserted into the digital camera, or the like.

An external connection unit 114 functions as an interface for establishing a connection between the digital camera and an external apparatus such as a personal computer (PC) or a printer.

Next, an operation flow at the time of picking up images using this digital camera will be described.

FIG. 2 is a flowchart showing a capturing processing procedure executed by the digital camera in FIG. 1. In this embodiment, a tracking mode for tracking the movement of an object specified by a user has been set in advance.

Turning on a power switch included in the operation unit 101 of the digital camera starts the procedure illustrated in this flowchart.

In step S201, power is supplied to various units included in the digital camera from a power supply, which is not shown, in accordance with an instruction of the control unit 102. When power is supplied to the various units included in the digital camera, the shutter is opened and a capturing operation for displaying a movie on the display unit 107 so as to allow observation of the object in real time starts. Electrical charge is accumulated at the image pickup element 103, and is output to the A/D conversion unit 104 as an analog image signal. The A/D conversion unit 104 performs sampling, gain control, A/D conversion, and the like on the analog image signal, and outputs a digital image signal. The image processing unit 105 performs various image processing including white balance processing, gamma conversion processing, and color conversion processing on this digital image signal. This is repeated at a prescribed frame rate and a movie showing the object in real time is displayed on the display unit 107 using an obtained digital image signal.

In step S202, in order to lead a user to select an object to be a tracking target, the control unit 102 causes the display unit 107 to display a tracking frame in the center portion of a displayed movie and display guidance for leading the user to superimpose the frame on the object to be a tracking target.

In step S203, the object-position setting unit 106 determines whether the user has moved the tracking frame by operating a button, which is included in the operation unit 101 but not shown in the figure, and has fixed the position thereof. The procedure stops until the user sets the position of the tracking frame, and when the position thereof is set (YES in step S203), the procedure proceeds to step S204.

In step S204, an area where the tracking frame set in step S203 exists is set as a tracking target area. Then, from among digital image signals obtained when the user performed an operation for fixing the tracking frame, a digital image signal corresponding to the area of the tracking target area is stored as a tracking-target-area image signal. The object-position setting unit 106 sends the coordinates of the tracking target area and the tracking-target-area image signal to the moving-object detection unit 115.

In step S205, the moving-object detection unit 115 performs comparison between time-series digital image signals that are included in a movie, and detects movement information of the object. First, an area whose horizontal and vertical lengths are each three times larger than that of the tracking target area is set as a reading area while the coordinates of the tracking target area are set in the central area. From the digital signals of a frame which comes after the frame in which the tracking target area was set, a digital image signal corresponding to this reading area is extracted and matching is performed between the extracted digital image signal and the stored tracking-target-area image signal. An area having the highest degree of matching with the tracking-target-area image signal is detected, and this detected area is set as a new tracking target area. The coordinates of the tracking target area and the tracking-target-area image signal are updated.

Figure 3A:
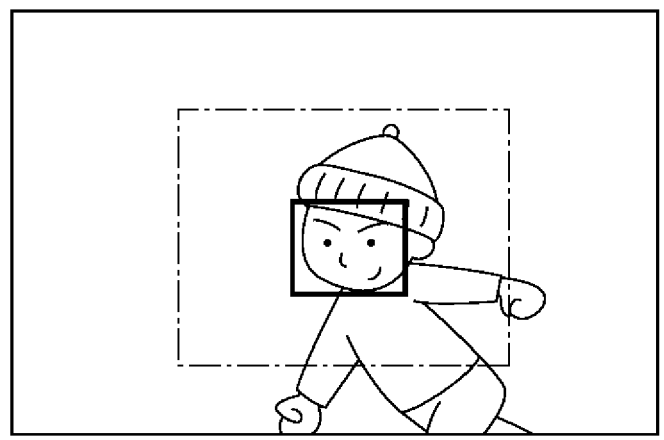
FIGS. 3A and 3B are diagrams illustrating a method of detecting a tracking target area.
Figure 3B:
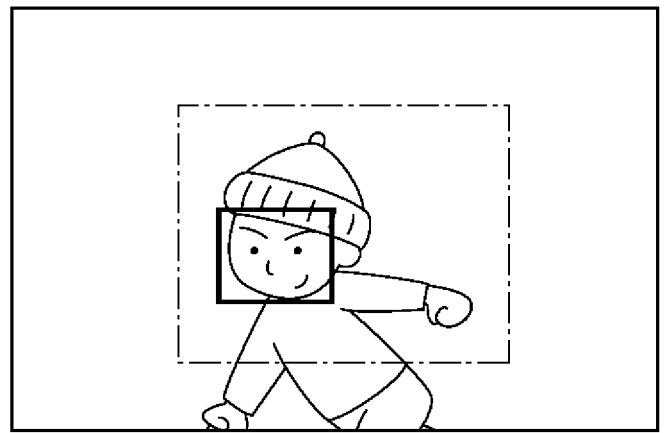

This will be illustrated using FIGS. 3A and 3B. FIGS. 3A and 3B each show an image displayed on the display unit 107. Movement information of an object is detected between a frame image shown in FIG. 3A and a frame image shown in FIG. 3B. In FIG. 3A, a gray thick frame superimposed on the face area of a person is a tracking frame set by a user. A reading area is set on the image shown in FIG. 3B in such a manner that the reading area has the same size and position as an area indicated by a chain frame in FIG. 3A whose horizontal and vertical lengths are each three times larger than that of the area of the tracking frame. An area having the highest degree of matching with the area within the tracking frame shown in FIG. 3A is detected from the reading area of FIG. 3B and the detected area is updated as a new tracking target area (a gray thick frame of FIG. 3B).

The moving-object detection unit 115 calculates an object vector (Tx, Ty) which is a difference between the coordinates of the center of the tracking target area in FIG. 3A and the coordinates of the center of the tracking target area detected in FIG. 3B and treats the object vector (Tx, Ty) as the movement information of the object. That is, the moving-object detection unit 115 functions as a first detection unit that detects the movement information of the object, which is a tracking target, from a movie generated at the image pickup element 103.

Moreover, the moving-object detection unit 115 calculates a background vector indicating movement information of the background from correlation between areas obtained by excluding the tracking target areas from two digital image signals used to detect the movement information of the object.

In step S206, the orientation-change detection unit 119 obtains movement information of the digital camera from the angular velocity sensor. The angular velocity sensor detects a change in orientation of a camera due to various effects of hand shake, panning, and the like. The orientation-change detection unit 119 calculates a difference in angle of field of the camera from the camera orientation-change information detected by the angular velocity sensor and the background vector calculated by the moving-object detection unit 115. A change in angle of field in the horizontal direction (panning direction) and vertical direction (tilt direction) due to a change in camera orientation is calculated as an angle-of-field vector (Gx, Gy) and treated as the movement information of the camera. Here, when the camera is rotated in the panning or tilt direction, the higher the magnification of the optical zoom is, the larger the object vector becomes with respect to the angle-of-field vector. Thus, the magnitude of the angle-of-field vector or the magnitude of the object vector is corrected in accordance with the magnification of the optical zoom. That is, the orientation-change detection unit 119 functions as a second detection unit that detects movement information of the apparatus main body.

In step S207, the moving-object tracking determination unit 116 determines the direction of the horizontal component (Tx) of the object vector and the direction of the horizontal component (Gx) of the angle-of-field vector. If the directions are opposite (Tx*Gx<0) (YES in step S207), the procedure proceeds to step S208. If the directions are not opposite (Tx*Gx≥0) (NO in step S207), the procedure proceeds to step S209.

In step S208, the moving-object tracking determination unit 116 compares the difference between the horizontal component (Tx) of the object vector and the horizontal component (Gx) of the angle-of-field vector with a threshold Th. If the difference between the horizontal component (Tx) of the object vector and the horizontal component (Gx) of the angle-of-field vector is smaller than the threshold Th (YES in step S208), the procedure proceeds to step S209. If the difference is not smaller than the threshold Th (NO in step S208), the procedure proceeds to step S214.

In step S209, the moving-object tracking determination unit 116 determines the direction of the vertical component (Ty) of the object vector and the direction of the vertical component (Gy) of the angle-of-field vector. If the directions are opposite (Ty*Gy<0) (YES in step S209), the procedure proceeds to step S210. If the directions are not opposite (Ty*Gy≥0) (NO in step S209), the procedure proceeds to step S211.

In step S210, the moving-object tracking determination unit 116 compares the difference between the vertical component (Ty) of the object vector and the vertical component (Gy) of the angle-of-field vector with the threshold Th. If the difference between the vertical component (Ty) of the object vector and the vertical component (Gy) of the angle-of-field vector is smaller than the threshold Th (YES in step S210), the procedure proceeds to step S211. If the difference is not smaller than the threshold Th (NO in step S210), the procedure proceeds to step S214.

In these steps S207 through S210, the moving-object tracking determination unit 116 compares the object vector with the angle-of-field vector. Regarding the object vector and the angle-of-field vector, when the directions of the horizontal components or the directions of the vertical components are opposite and when the difference between the horizontal components or the difference between the vertical components is greater than or equal to a threshold, it is determined that tracking cannot be continued. Then, the procedure proceeds to step S214. In contrast, if any of the conditions is not satisfied, it is determined that tracking can be continued, and the procedure proceeds to step S211.

If a camera is shifted so as to follow an object, it is considered that a large difference should not occur between the object vector and the angle-of-field vector. Thus, if a large difference does not occur between the object vector and the angle-of-field vector, it is determined that tracking has been successfully performed, whereby tracking is continued.

In contrast, as described in an example of the related art, if a tracking frame is set on an unintended object, there is no correlation between the movement of a camera which is shifted to follow an intended object, an angle-of-field vector intended by a user regarding the intended object, and the position of the tracking frame. Thus, if there is a large difference between the object vector and the angle-of-field vector, it is determined that tracking has failed, whereby tracking is terminated.

For example, when the camera is not shifted by a large amount, that is, the angle-of-field vector itself is small, the moving-object tracking determination unit 116 may determine that tracking has been successfully performed regardless of the magnitude or direction of the object vector. Alternatively, when the angle-of-field vector is small, the value of the threshold Th may be set larger than when the angle-of-field vector is large, whereby it tends not to be determined that tracking has failed.

When the angle-of-field vector is small, it is considered that the user does not intend to change it, and there is a possibility that the user is capturing an object that is moving around such as a person playing sport or a playing child with a wide angle of field.

Moreover, even in a case where a sport mode or a shutter-speed prioritized mode is set as a capturing mode, there is a high possibility that an object may move around. Thus, even when there is a large difference between the object vector and the angle-of-field vector, it is no problem to determine that tracking has been successfully performed. Alternatively, the threshold Th may be set larger than in other capturing modes.

Moreover, the moving-object tracking determination unit 116 may set the threshold Th smaller as the angle between the object vector and the angle-of-field vector becomes larger so that the probability of determining that tracking cannot be continued becomes higher. Moreover, even though the directions of the horizontal components of the object vector and angle-of-field vector or the directions of the vertical components of the object vector and angle-of-field vector are not opposite, if the angle between the object vector and the angle-of-field vector is larger than a predetermined value, comparison with the threshold Th may be performed.

Moreover, in order to suppress the effect of instantaneous camera shake such as hand shake, the object vector may be calculated from the movement information of the object detected over a plurality of frames and the angle-of-field vector may be calculated from the movement information of the camera detected over a plurality of frames.

In this way, the moving-object tracking determination unit 116 functions as a determination unit that determines whether object tracking performed by the first detection unit should be continued on the basis of a comparison result of the comparison unit.

In step S211, the display unit 107 displays the tracking frame which is moved to and superimposed on the updated tracking target area.

In step S212, the AF processing unit 108 drives the focus lens included in the lens 117 in such a manner that the object within the updated tracking target area is in focus, and the AE processing unit 109 adjusts the size of the opening of the aperture of the exposure mechanism 118 in such a manner that the brightness of the same area becomes an appropriate value.

In step S213, the control unit 102 determines whether the shutter switch has been half pressed and the SW 1 signal has been input. If the control unit 102 determines that the SW 1 signal has been input (YES in step S213), the procedure proceeds to step S217. If the control unit 102 determines that the SW 1 signal has not been input (NO in step S213), the procedure returns to step S205 and tracking processing is continued using a digital image signal of a new frame. In this way, until the SW 1 signal is input to the control unit 102 in step S213, while tracking is successfully performed, tracking processing regarding the object set as the tracking target area in step S204 is continuously performed.

Here, in step S208 or S210, if it is determined that the moving-object tracking determination unit 116 has failed tracking, in step S214, the moving-object tracking determination unit 116 terminates display of the tracking frame on the image which is displayed on the display unit 107. Then, the moving-object detection unit 115 resets the coordinates of the tracking target area and the tracking-target-area image signal.

In step S215, the focus lens included in the lens 117 is driven in such a manner that the object in the area of the central portion of the angle of field is in focus, and the size of the opening of the aperture of the exposure mechanism 118 is adjusted by the AE processing unit 109 in such a manner that the brightness of the same area becomes an appropriate value.

In step S216, the control unit 102 determines whether the shutter switch has been half pressed and the SW 1 signal has been input. If the control unit 102 determines that the SW 1 signal has been input (YES in step S216), the procedure proceeds to step S217. If the control unit 102 determines that the SW 1 signal has not been input (NO in step S216), the procedure returns to step S202 and guidance for leading a user to select an object to be a tracking target is displayed.

In step S213 or S216, if the SW 1 signal is input to the control unit 102, in step S217, the position of the focus lens included in the lens 117 and the size of the opening of the aperture of the exposure mechanism 118 are fixed to the state that was set immediately before the SW 1 signal was input. Using the value of brightness at that time, the control unit 102 determines whether to cause the EF processing unit 110 to perform flash processing. In step S218, the procedure stops until the SW 2 signal is input to the control unit 102. When the SW 2 signal is input (YES in step S218), the procedure proceeds to step S219.

In step S219, the control unit 102 causes the flash unit 111 to flash as needed and causes a real exposure operation to be performed. The digital image signal generated through real exposure is converted into a format such as JPEG by the format conversion unit 112, and the resulting data is output to the image recording unit 113. The image recording unit 113 performs processing of recording the image data whose format has been converted, in a predetermined memory.

In this way, in a case where the movement of an object is tracked, a camera according to this embodiment determines that tracking has failed when there is a large difference between the movement of the camera and the movement of the object which is a tracking target. With this structure, when an object which is not intended by a user is set as a tracking target, the object can be promptly canceled from being a tracking target, whereby the usability of the camera is improved. The description has been made regarding a digital camera as an example; however, as a matter of course, the above-described structure can be applied to a case where a movie is captured using a digital video camera.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-144549 filed Jun. 2, 2008, which is hereby incorporated by reference herein in its entirety.

What is claimed is:

1. An image pickup apparatus comprising:
a first detection unit configured to detect movement information of an object which is a tracking target from a movie generated at an image pickup element;
a second detection unit configured to detect movement information of a main body of the image pickup apparatus; and
a determination unit configured to determine that tracking cannot be continued when a horizontal component of the motion vector of the main body and a horizontal component of the motion vector of the object are opposite and/or a vertical component of the motion vector of the main body and a vertical component of the motion vector of the object are opposite and when the difference between the motion vector of the main body and the motion vector of the object is larger than a certain threshold.

2. The image pickup apparatus according to claim 1, wherein the determination unit corrects the motion vector in accordance with the magnification of an optical zoom.

3. The image pickup apparatus according to claim 1, wherein the determination unit determines that tracking cannot be continued when the direction of the motion vector of the main body and the direction of the motion vector of the object are opposite and when the difference between the motion vector of the main body and the motion vector of the object is larger than the certain threshold.

4. The image pickup apparatus according to claim 1, further comprising a setting unit configured to detect the face of the object from the movie and set an area in which the detected face exists as a tracking target.

5. The image pickup apparatus according to claim 1, further comprising a setting unit configured to set an area specified through an operation performed by a user, as a tracking target.

6. The image pickup apparatus according to claim 1, wherein the first detection unit compares time-series images included in the movie and detect the movement information of the object by performing matching.

7. The image pickup apparatus according to claim 1, wherein the second detection unit receives movement information from a sensor within the main body.

8. The image pickup apparatus according to claim 7, wherein the sensor is an angular velocity sensor.

9. The image pickup apparatus according to claim 8, wherein the angular velocity sensor is a gyroscope.

10. The image pickup apparatus according to claim 1, wherein the second detection unit detects a change in orientation of the main body.

11. The image pickup apparatus according to claim 10, wherein the change in orientation of the main body is selected by a user.

12. The image pickup apparatus according to claim 10, wherein the change in orientation of the main body is an unintentional movement made by a user.

13. The image pickup apparatus according to claim 1, wherein the determination unit determines that tracking cannot be continued when the angle between the motion vector of the main body and the motion vector of the object is larger than a predetermined value and when the difference between the motion vector of the main body and the motion vector of the object is larger than the certain threshold.

14. The image pickup apparatus according to claim 1, wherein the determination unit sets the certain threshold smaller as the angle between the motion vector of the main body and the motion vector of the object is larger.

15. A method for an image pickup apparatus, comprising:
detecting movement information of an object which is a tracking target from a movie generated at an image pickup element;
detecting movement information of a main body of the image pickup apparatus; and
determining that tracking cannot be continued when a horizontal component of the motion vector of the main body and a horizontal component of the motion vector of the object are opposite and/or a vertical component of the motion vector of the main body and a vertical component of the motion vector of the object are opposite and when the difference between the motion vector of the main body and the motion vector of the object is larger than a certain threshold.

16. The method according to claim 15, wherein detecting movement information of the main body further comprises reading a sensor from within the main body.

17. An image pickup apparatus comprising:
a first detection unit configured to detect movement information of an object which is a tracking target from a movie generated at an image pickup element;
a second detection unit configured to receive movement information from a sensor within a main body of the image pickup apparatus, wherein the sensor is configured to send changes in orientation of the main body selected by a user or unintentional movements of the main body made by the user; and
a determination unit configured to determine that tracking cannot be continued when a horizontal component of the motion vector of the main body and a horizontal component of the motion vector of the object are opposite and/or a vertical component of the motion vector of the main body and a vertical component of the motion vector of the object are opposite and when the difference between the motion vector of the main body and the motion vector of the object is larger than a certain threshold.

* * * * *